US010492212B1

(12) United States Patent
Nammi

(10) Patent No.: US 10,492,212 B1
(45) Date of Patent: Nov. 26, 2019

(54) SCHEDULING ULTRA-RELIABLE LOW LATENCY COMMUNICATIONS IN WIRELESS COMMUNICATION SYSTEMS

(71) Applicant: AT&T Intellectual Property I, L.P., Atlanta, GA (US)

(72) Inventor: SaiRamesh Nammi, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/016,091

(22) Filed: Jun. 22, 2018

(51) Int. Cl.
| H04W 72/04 | (2009.01) |
| H04W 72/12 | (2009.01) |
| H04W 72/06 | (2009.01) |
| H04L 5/00  | (2006.01) |

(52) U.S. Cl.
CPC ....... H04W 72/1226 (2013.01); H04L 5/0048 (2013.01); H04L 5/0057 (2013.01); H04W 72/06 (2013.01); H04W 72/1278 (2013.01)

(58) Field of Classification Search
None
See application file for complete search history.

(56) References Cited

U.S. PATENT DOCUMENTS

| 7,352,722 | B2 | 4/2008  | Malladi et al. |
| 8,340,587 | B2 | 12/2012 | Gaal et al. |
| 9,178,583 | B2 | 11/2015 | Nam et al. |
| 9,572,060 | B2 | 2/2017  | von Elbwart et al. |
| 9,801,181 | B2 | 10/2017 | Huang et al. |

(Continued)

FOREIGN PATENT DOCUMENTS

| EP | 2134134 A1    | 1/2012  |
| WO | 2010104334 A2 | 11/2010 |

(Continued)

OTHER PUBLICATIONS

Mahmoud, et al., "Radio Resource Management Techniques for eMBB and mMTC services in 5G Dense Small Cell Scenarios," Published in: 2016 IEEE 84th Vehicular Technology Conference (VTC—Fall), 6 pages.

(Continued)

*Primary Examiner* — Phuongchau Ba Nguyen
(74) *Attorney, Agent, or Firm* — Amin, Turocy & Watson, LLP

(57) ABSTRACT

The described technology is generally directed towards ultra-reliable low latency communications between a network device and a user equipment, using scheduling parameters for a less conservative block error rate threshold based on the spectral efficiency. A network device obtains channel state information comprising a rank indicator, a layer indicator indicating a strongest layer, a first channel quality indicator corresponding to a first coding rate and a first modulation value for a first conservative block error rate threshold value, and a second channel quality indicator corresponding to a second coding rate and second modulation value for a second conservative block error rate threshold value. When the network device determines that that the first coding rate and the first modulation value are suitable for ultra-reliable low latency communications, the network device schedules the user equipment to use the first coding rate and the first modulation value, e.g., using the strongest layer.

12 Claims, 10 Drawing Sheets

(56) References Cited

U.S. PATENT DOCUMENTS

| | | | |
|---|---|---|---|
| 9,967,012 | B2 | 5/2018 | Onggosanusi et al. |
| 10,064,124 | B2 | 8/2018 | Lindoff et al. |
| 10,374,679 | B2 | 8/2019 | Wilson et al. |
| 2007/0147289 | A1 | 6/2007 | Nibe et al. |
| 2012/0236817 | A1* | 9/2012 | Chen ............... H04B 7/0417 370/329 |
| 2013/0083719 | A1 | 4/2013 | Seo et al. |
| 2014/0185479 | A1 | 7/2014 | Lee |
| 2014/0233503 | A1* | 8/2014 | Aiba ............... H04L 1/1812 370/329 |
| 2014/0370904 | A1 | 12/2014 | Smith et al. |
| 2015/0003275 | A1 | 1/2015 | Krishnamurthy |
| 2015/0092566 | A1 | 4/2015 | Balachandran et al. |
| 2016/0006495 | A1 | 1/2016 | Kim et al. |
| 2016/0218822 | A1 | 7/2016 | Meng et al. |
| 2016/0302127 | A1 | 10/2016 | Moon et al. |
| 2016/0309476 | A1 | 10/2016 | Madan et al. |
| 2016/0360475 | A1 | 12/2016 | Lindoff et al. |
| 2017/0019162 | A1 | 1/2017 | Jeong et al. |
| 2017/0149548 | A1 | 5/2017 | Mouhouche |
| 2017/0324455 | A1 | 11/2017 | Soriaga et al. |
| 2018/0034612 | A1 | 2/2018 | Lin et al. |
| 2018/0042028 | A1 | 2/2018 | Nam et al. |
| 2018/0048365 | A1 | 2/2018 | Yoo et al. |
| 2018/0103428 | A1 | 4/2018 | Jiang et al. |
| 2018/0109302 | A1 | 4/2018 | Nagaraja et al. |
| 2018/0138960 | A1 | 5/2018 | Ahn et al. |
| 2018/0145737 | A1 | 5/2018 | Rahman et al. |
| 2018/0287686 | A1 | 10/2018 | Wilson et al. |
| 2018/0337764 | A1 | 11/2018 | Kwok et al. |
| 2018/0368133 | A1* | 12/2018 | Park ............... H04W 72/048 |
| 2019/0036585 | A1 | 1/2019 | Hosseini et al. |
| 2019/0103946 | A1 | 4/2019 | Li et al. |
| 2019/0207667 | A1 | 7/2019 | Zhou et al. |

FOREIGN PATENT DOCUMENTS

| | | | |
|---|---|---|---|
| WO | 2016072784 A1 | 5/2016 | |
| WO | 2017026860 A1 | 2/2017 | |
| WO | 2017175937 A1 | 10/2017 | |
| WO | 2018028182 A1 | 2/2018 | |
| WO | 2018034421 A1 | 2/2018 | |
| WO | WO 2018/018182 A1 * | 2/2018 | ............ H04W 24/08 |
| WO | 2018044849 A1 | 3/2018 | |
| WO | 2018052258 A1 | 3/2018 | |
| WO | 2018058599 A1 | 4/2018 | |
| WO | 2018058600 A1 | 4/2018 | |
| WO | 2018062937 A1 | 4/2018 | |
| WO | 2018064182 A1 | 4/2018 | |
| WO | 2018091072 A1 | 5/2018 | |
| WO | 2018097947 A2 | 5/2018 | |

OTHER PUBLICATIONS

Pocovi, et al., "Joint Link Adaptation and Scheduling for 5G Ultra-Reliable Low-Latency Communications," vol. 4, 2016, 12 pages.

International Search Report and Written Opinion received for PCT Application Serial No. PCT/US2019/030716 dated Aug. 9, 2019, 18 pages.

AT&T, "CQI/MCS Reporting for URLLC", URL: http://www.3gpp.org/ftp/tsg%5Fran/WG1%5FRL1/TSGR1%5F93/Docs, 3GPP TSG RAN WG1 Meeting #93, R1-1806977, May 21-25, 2018, pp. 1-6.

MediaTek Inc., "CQI reporting for multiple services in NR", URL: http://www.3gpp.org/ftpjtsg%5Fran/WG1%5FRL1/TSGR1%5FAH/NR%5FAH%5F1801/Docs/, 3GPP TSG RAN WG1 Meeting AH-1801, R1-1800169, Jan. 22-26, 2018, 6 pages.

Huawei et al., "PDSCH design for URLLC", URL: http://www.3gpp.org/ftp/Meetings%5F3GPP%5FSYNC/RAN1/Docs, 3GPP TSG RAN WG1 Meeting #93, R1-1805900, May 21-25, 2018, 9 pages.

"Physical layer procedures for data", URL: http://www.3gpp.orgiftp/tsg%5Fran/WG1%5FRL1/TSGR1%5FAH/NR%5FAH%5F1801/Docs, 3GPP TS 38.214, 3rd Generation Partnership Project, Technical Specification Group Radio Access Network, NR, Release 15, Feb. 2018, pp. 1-73.

"Ericsson, Offline Discussion on Support of Separate COI and MCS table(s) for URLLC, Apr. 16th-20th, 2018, 3GPP TSG RANWGI, Agenda Item: 7.2.1, pp. 1-6. (Year: 2018)".

"Gerardino, Radio Resource Management for Ultra-Reliable Low-Latency Communications in 5G, 2017, Aalborg University Press, pp. i-xxiv and 1-223. (Year: 2017)".

"Samsung et al., WF for Open Issues on CSI Reporting, Sep. 18th-21st, 2017, 3GPP TSG-RAN WG1 NR-AH3, Agenda:6.2.2.2, pp. 1-19. (Year: 2017)".

Office Action for U.S. Appl. No. 15/977,461 dated Oct. 3, 2019, 47 pages.

* cited by examiner

SCHEDULING ULTRA-RELIABLE LOW LATENCY COMMUNICATIONS IN WIRELESS COMMUNICATION SYSTEMS

TECHNICAL FIELD

The subject application is related to wireless communication systems, and, for example, to scheduling ultra-reliable low latency communications in a wireless communication system based on spectral efficiency and layer indicator considerations.

BACKGROUND

In wireless communication systems, including New Radio (NR, sometimes referred to as 5G) and likely beyond, user equipment computes channel estimates based on pilot or reference signals, and computes the parameters needed for channel state information (CSI) reporting. A CSI report is sent from the user equipment to a network device via a feedback channel on request from the network (aperiodically), or the user equipment may be configured to send the CSI report periodically. A network scheduler uses this information in choosing the parameters for scheduling of this particular user equipment. The network sends the scheduling parameters to the user equipment in a downlink control channel. After that, actual data transfer takes place from the network to the user equipment.

The time and frequency resources that can be used by the user equipment to report CSI are controlled by the network, which sends reporting configuration settings to the user equipment for configuring the report. For example, the user equipment determines the channel quality indicator (CQI), which indicates the highest modulation and code rate at which the block error rate (BLER) of the channel being analyzed will not exceed a CQI threshold, which is $10^{-1}$ for the enhanced mobile broadband (eMbb) service category. This CQI threshold for eMbb is often not appropriate for more reliable communications; however spectral efficiency is reduced when a more conservative block error rate threshold is used.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
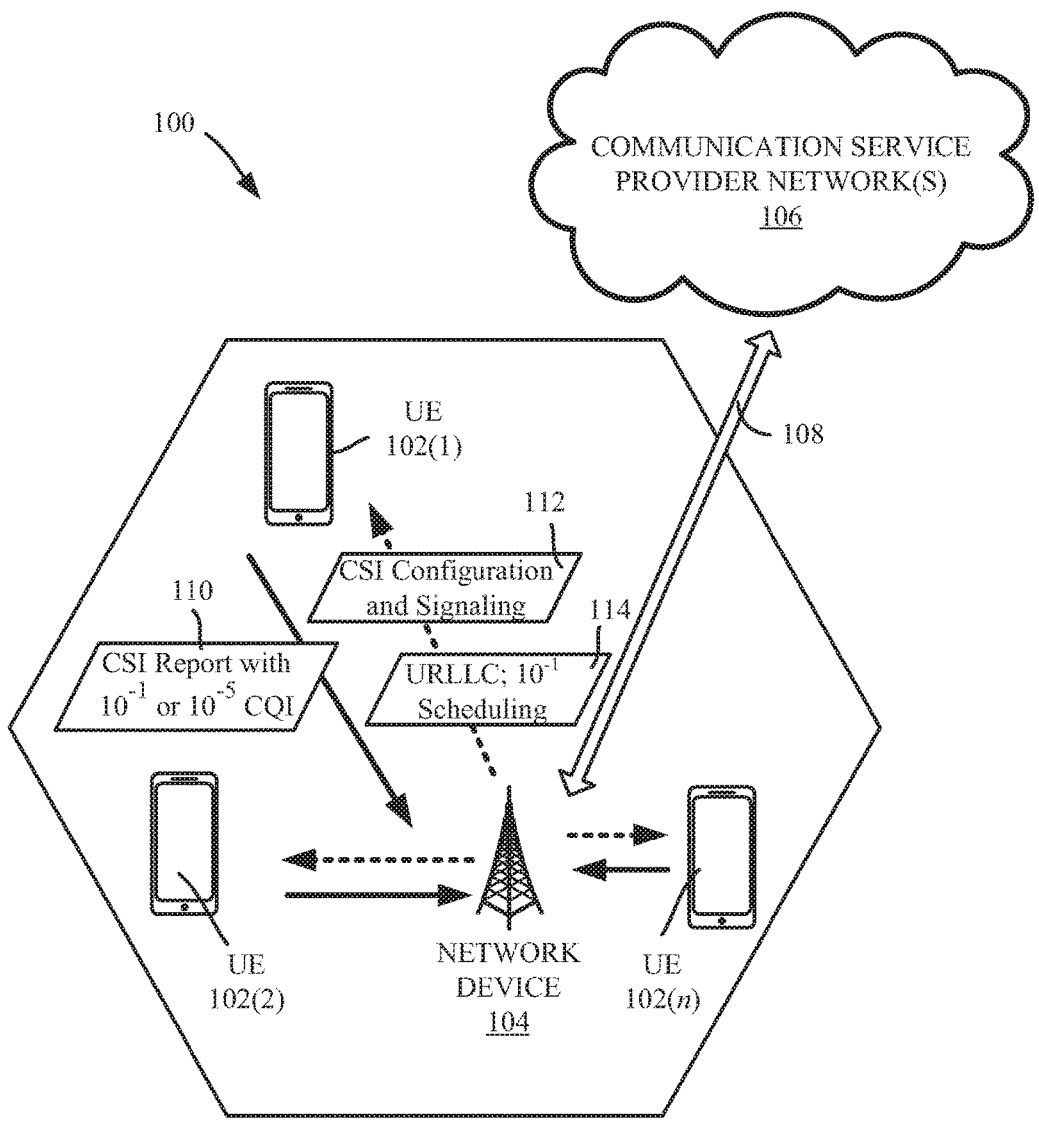
FIG. 1 illustrates an example wireless communication system in which a network node device (e.g., network node) and user equipment (UE) can use layer information in scheduling to implement various aspects and implementations of the subject disclosure.

Briefly, one or more aspects of the technology described herein are generally directed towards scheduling data communication (uplink or downlink) for a user equipment, including new radio ultra-reliable low latency communications, based on the layer indicator returned in a channel state information report to a network device (e.g., corresponding to a base station). In general, the layer indicator informs the network device which layer is the strongest layer with respect to signal strength, e.g., corresponding to signal-to-noise ratio and/or signal-to-interference-plus-noise ratio. The network device and the user equipment can communicate ultra-reliable low latency communications, e.g., via a port corresponding to the layer indicator, with a less conservative block error rate threshold (e.g., of $10^{-1}$) instead of a more conservative block error rate threshold of (e.g., of $10^{-5}$). This can be based on the spectral efficiency, which is often significantly better with the less conservative block error rate threshold than with the more conservative block error rate threshold. Note that although the less conservative block error rate threshold is used, by using the strongest layer, in practice the actual block error rate can be significantly lower than $10^{-1}$, whereby the parameters (including modulation and coding rate) for the less conservative block error rate threshold are suitable for ultra-reliable low latency communications. In this way, ultra-reliable low latency communications can be communicated with greater spectral efficiency than if the more conservative block error rate threshold is used as the basis for scheduling data communications.

In general, for ultra-reliable low latency communications, a network device benefits from receiving two reported channel quality indicators from a user equipment, namely (according to one standard) one channel quality indicator (CQI) corresponding to a less conservative block error rate threshold of $10^{-1}$ and another CQI corresponding to a more conservative block error rate threshold of $10^{-5}$. To this end, the network device configures the user equipment channel state information using a higher layer message such as radio resource control by indicating one threshold for one report setting, and the network device configures another report setting for a different threshold. In each report setting the network can indicate what parameter values are to be returned with the channel state information, e.g., the channel state information may comprise the channel quality indicator (CQI), preceding matrix indicator (PMI), CSI-RS resource indicator (CRI), rank indicator (RI) and/or layer indicator (LI), among other possible reported information. Once the user equipment is configured with the settings to report with the CSI, the user equipment reports the CSI periodically or aperiodically.

In one aspect, the spectral efficiency is determined (e.g., computed) for each block error rate threshold according to the CSI, e.g., based on the modulation value and coding rate for the less conservative threshold and based on the modulation value, coding rate and transmission rank for the more conservative threshold. If, based on the spectral efficiency, the less conservative block error rate threshold is suitable for ultra-reliable low latency communications, the modulation and coding rate is used, e.g., with the port based on the layer indicator, e.g., the strongest layer.

It should be understood that any of the examples and terms used herein are non-limiting. For instance, some examples are based on New Radio (NR, sometimes referred to as 5G) communications between a user equipment exemplified as a smartphone or the like and network device; however virtually any communications devices may benefit from the technology described herein, and/or their use in different spectrums may likewise benefit. Thus, any of the embodiments, aspects, concepts, structures, functionalities or examples described herein are non-limiting, and the technology may be used in various ways that provide benefits and advantages in radio communications in general.

FIG. 1 illustrates an example wireless communication system 100 in accordance with various aspects and embodiments of the subject technology. In one or more embodiments, the system 100 can comprise one or more user equipment, e.g., UEs 102(1)-102(n).

In various embodiments, the system 100 is or comprises a wireless communication network serviced by one or more wireless communication network providers. In example embodiments, a UE 102 can be communicatively coupled to the wireless communication network via a network device 104 (e.g., network node). The network device 104 can communicate with the user equipment (UE), thus providing connectivity between the UE and the wider cellular network.

In example implementations, each UE such as the UE 102(1) is able to send and/or receive communication data via a wireless link to the network device 104. The dashed arrow lines from the network device 104 to the UE 102 represent downlink (DL) communications and the solid arrow lines from the UE 102 to the network device 104 represents uplink (UL) communications.

The system 100 can further include one or more communication service provider networks 106 that facilitate providing wireless communication services to various UEs, including UES 102(1)-102(n), via the network device 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.).

The network device 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

The wireless communication system 100 can employ various cellular systems, technologies, and modulation schemes to facilitate wireless radio communications between devices (e.g., a UE 102 and the network device 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Another concept is that of the rank of the transmission. In multiple antenna techniques, the incoming data can be split to be transmitted through multiple antennas, wherein each data stream processed and transmitted through an antenna is referred to as a transmission layer. The number of transmission layers is typically the number of transmit antennas. The data can be split into several parallel streams, where each stream contains different information. In another type, the incoming data is duplicated and each antenna transmits the same information. The term spatial layer refers to a data stream that includes information not included at the other layers. The rank of the transmission is equal to the number of spatial layers in an LTE spatial multiplexing transmission, that is, equals the number of different transmission layers transmitted in parallel. Even though the information in each layer may be manipulated in different ways by mathematical operations, when the operations do not change the information transmitted, a transmitter can be referred to as operating as a rank-1 transmitter. In a multi-antenna transmitter, different pieces of information are transmitted in parallel simultaneously in up to four different layers; a transmitter transmitting different information in parallel using four layers operates as a rank-4 transmitter.

In FIG. 1, as described herein, a user equipment (e.g., 102(1)) is configured by the network device to provide the network device 104 with a channel state information report 110 that the network device uses in scheduling the user equipment 102(1). Unlike conventional reporting, the network device 104 can request (via configuration and signaling 112) a channel quality indicator that includes channel quality indicator data based on the ultra-reliable low latency communication and channel quality indicator based on the enhanced mobile broadband block error rate threshold. Otherwise, the network device 104 can request the channel state information report with channel quality indicator data based only on the enhanced mobile broadband block error rate threshold.

In one or more alternative implementations, the user equipment is instructed to report the channel quality information in the channel state information report according to a block error rate threshold configuration setting (a parameter value) provided by the network. In other words, the network configures the user equipment with channel state information report settings, including a block error rate threshold setting. Thus, along with the resources for channel state information reporting, the network sends a parameter with a value indicating which block error rate threshold is desired for computing the channel quality information, e.g., the ultra-reliable low latency communication mode block error rate threshold and/or the enhanced mobile broadband mode block error rate threshold. This can be changed by the network, by requesting a new report.

To this end, the network device 104 can perform radio resource control (RRC)/higher layer signaling, e.g., in which one bit can be used indicate to the user equipment whether it is in the ultra-reliable low latency communication mode or enhanced mobile broadband mode, and thereby which CQI format to use. Alternatively, the network device 104 can perform dynamic signaling layer indicator L1/L2, in which when the network requests an aperiodic channel state information report, the network device 104 indicates how to report the channel quality indicator data. Note that the network device 104 can use both (RRC)/higher layer signaling and dynamic signaling.

In this way, the network has a user equipment report channel quality information, in a channel state information report, that includes channel quality information based on a block error rate threshold value that corresponds to an ultra-reliable low latency communication when the user equipment is in the ultra-reliable low latency communication mode. In one or more implementations, the ultra-reliable low latency communication block error rate threshold value is $10^{-5}$, in contrast to the $10^{-1}$ block error rate threshold for enhanced mobile broadband communication. Note that two different thresholds are used rather than using the high-reliability $10^{-5}$ threshold because when only conventional reliability is needed, the spectral efficiency is greater than the spectral efficiency with high reliability.

In one or more implementations, the channel state information report includes channel quality information corresponding to the ultra-reliable low latency communication mode block error rate threshold and the channel quality information corresponding to the enhanced mobile broadband mode block error rate threshold. This allows the network to schedule the user equipment according to whichever mode is in use, and switch the scheduling any time the mode changes from the ultra-reliable low latency communication mode to the enhanced mobile broadband mode, or vice-versa.

The following table, TABLE 1 shows how channel quality indicator can be reported:

| PMI-FormatIndicator = widebandPMI and CQI-FormatIndicator = widebandCQI | PMI-FormatIndicator = subbandPMI or CQI-FormatIndicator = subbandCQI | | |
|---|---|---|---|
| | | CSI Part II | |
| | CSI Part I | wideband | Sideband |
| CRI | CRI | Wideband CQI for the second TB | Subband differential CQI for the second TB of all even subbands |
| Rank Indicator | Rank Indicator | PMI wideband (X1 and X2) | PMI subband information fields $X_2$ of all even subbands |
| Layer Indicator | Layer Indicator | — | Subband differential CQI for the second TB of all odd subbands |
| PMI wideband (X1 and X2) | Wideband CQI | — | PMI subband information fields $X_2$ of all odd subbands |
| Wideband CQI | Subband differential CQI for the first TB | — | — |

The technology described herein uses the layer indicator to schedule data, based on the spectral efficiency. For example, once the network obtains the information about the LI, then it can schedule the UE with rank equal to one and transmit with higher MCS (modulation and coding scheme) as $$SINR\_LI \geq SINR\_CQI$$

where SINR_LI is the SINR corresponding to the stronger layer and SINR_CQI corresponding to the CQI computed by the user equipment for any given threshold. Hence rather than using a threshold of $10^{-5}$, the network can schedule the user equipment with rank equal to one and port number equal to LI if the spectral efficiency is greater.

By way of example, the network can compute the spectral efficiency for the less conservative and more conservative block error rate thresholds, e.g., with a CQI threshold of $10^{-1}$, with a modulation of M1, a coding rate CR is R1, the spectral efficiency can be determined as (Case 1, less conservative):

$$SE1=M1*R1$$

With the CQI threshold of $10^{-5}$, the modulation is M2, the coding rate CR is R2 and the transmission rank is R, the spectral efficiency can be determined as (Case 2, more conservative):

$$SE2=M2*R2*R$$

For ultra-reliable low latency communication (URLLC) data traffic, the network schedules the user equipment with the Case 1, less conservative parameters if SE1≥SE2. This is represented in FIG. 1 via the block 114 which shows URLLC scheduling with the $10^{-1}$ parameters. If SE1<SE2, the network schedules based on the Case 2, more conservative parameters.

Note that for eMBB traffic (the CQI threshold is $10^{-1}$) and the modulation is M1, CR is R1 and the transmission rank is equal to R, then the spectral efficiency is defined as $$SE2=M1*R1*R$$

and the M1, R1 and R parameters are used in scheduling.

In general, the network configures the user equipment with channel state information report settings, where the network indicates the block error rate threshold and the resources for channel state information reporting. Hence, as an example, the network configures the channel state information report setting I with threshold of $10^{-1}$ and the PUCCH (physical uplink control channel) resources, then the user equipment reports the channel quality indicator corresponds to the threshold of $10^{-1}$ on the resources allocated by the network. Similarly, consider that the network configures the channel state information report setting II with threshold of $10^{-5}$ and the PUCCH resources; then the user equipment reports the channel quality indicator corresponds to the threshold of $10^{-5}$ on the resources allocated by the network. Hence, the block error rate threshold is indicated in the channel state information report setting.

More particularly, the time and frequency resources that can be used by the user equipment to report channel state information are controlled by the network device 104. The channel state information may comprise the channel quality indicator (CQI), preceding matrix indicator (PMI), CSI-RS resource indicator (CRI), SS/PBCH Block Resource indicator (SSBRI), layer indicator (LI), rank indicator (RI) and/or L1-RSRP (Reference Signal Received Power).

For CQI, PMI, CRI, SSBRI, LI, RI, L1-RSRP, the user equipment 102(1) is configured by higher layers with N≥1 CSI-ReportConfig reporting settings, M≥1 CSI-ResourceConfig resource settings, and one or two list(s) of trigger states (given by the higher layer parameters aperiodicTriggerStateList and semiPersistentOnPUSCH-TriggerStateList, (where PUSCH stands for physical uplink shared channel). Each trigger state in aperiodicTriggerStateList contains a list of associated CSI-ReportConfigs indicating the Resource Set IDs for channel and optionally for interference. Each trigger state in semiPersistentOnPUSCH-TriggerStateList contains one associated CSI-ReportConfig.

With respect to the reporting settings, in one or more implementations, each reporting setting in CSI-ReportConfig is associated with a single downlink bandwidth part (BWP) (indicated by higher layer parameter bwp-Id) given in the associated CSI-ResourceConfig for channel measurement) and contains the parameter(s) for one CSI reporting band: codebook configuration including codebook subset restriction, time-domain behavior, frequency granularity for CQI and PMI, measurement restriction configurations, block error rate (BLER) threshold for CQI (e.g., to choose the $10^{-1}$ or $10^{-5}$ threshold) and the CSI-related quantities to be reported by the UE such as the layer indicator (LI), L1-RSRP, CRI, and SSBRI (SSB Resource Indicator).

Thus, the channel state information report configuration settings contain the configuration settings for the block error rate (BLER) threshold for the channel quality indicator. That is, the settings include a parameter value by which the user equipment knows on which block error rate (e.g., $10^{-1}$ or $10^{-5}$) threshold to base the channel quality indicator that is reported.

Figure 2:
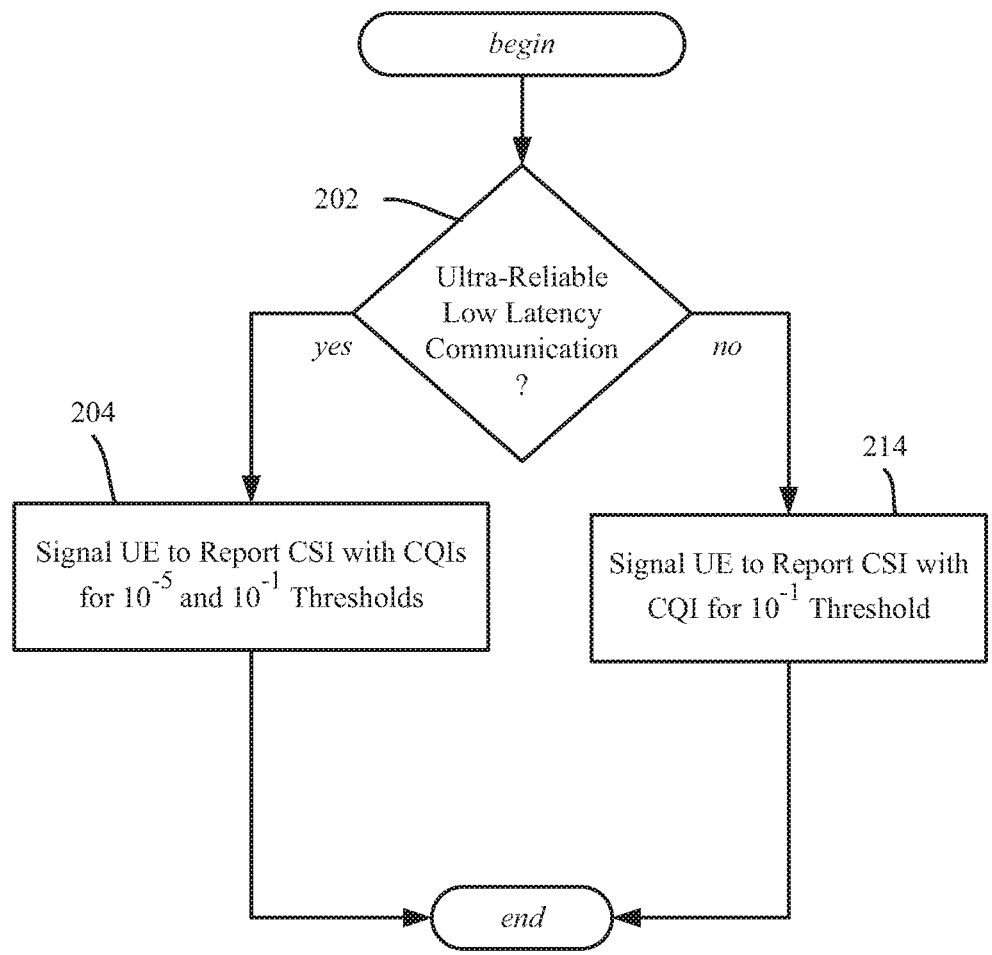
FIG. 2 illustrates an example flow diagram of network device operations for configuring a user equipment to return CQI information corresponding to different block error rate thresholds, in accordance with various aspects and implementations of the subject disclosure.

FIG. 2 summarizes example operations of a network device, beginning at operation 202 which represents determining whether URLLC traffic is to be present. If so, operation 204 configures to report CSIs with CQIs for $10^{-5}$ and $10^{-1}$ thresholds, so that the above spectral efficiency determination can be made. Otherwise, for eMbb traffic, the $10^{-1}$ threshold suffices. Note that this can be changed at any time and the network device can get a new report(s) as needed.

Figure 3:
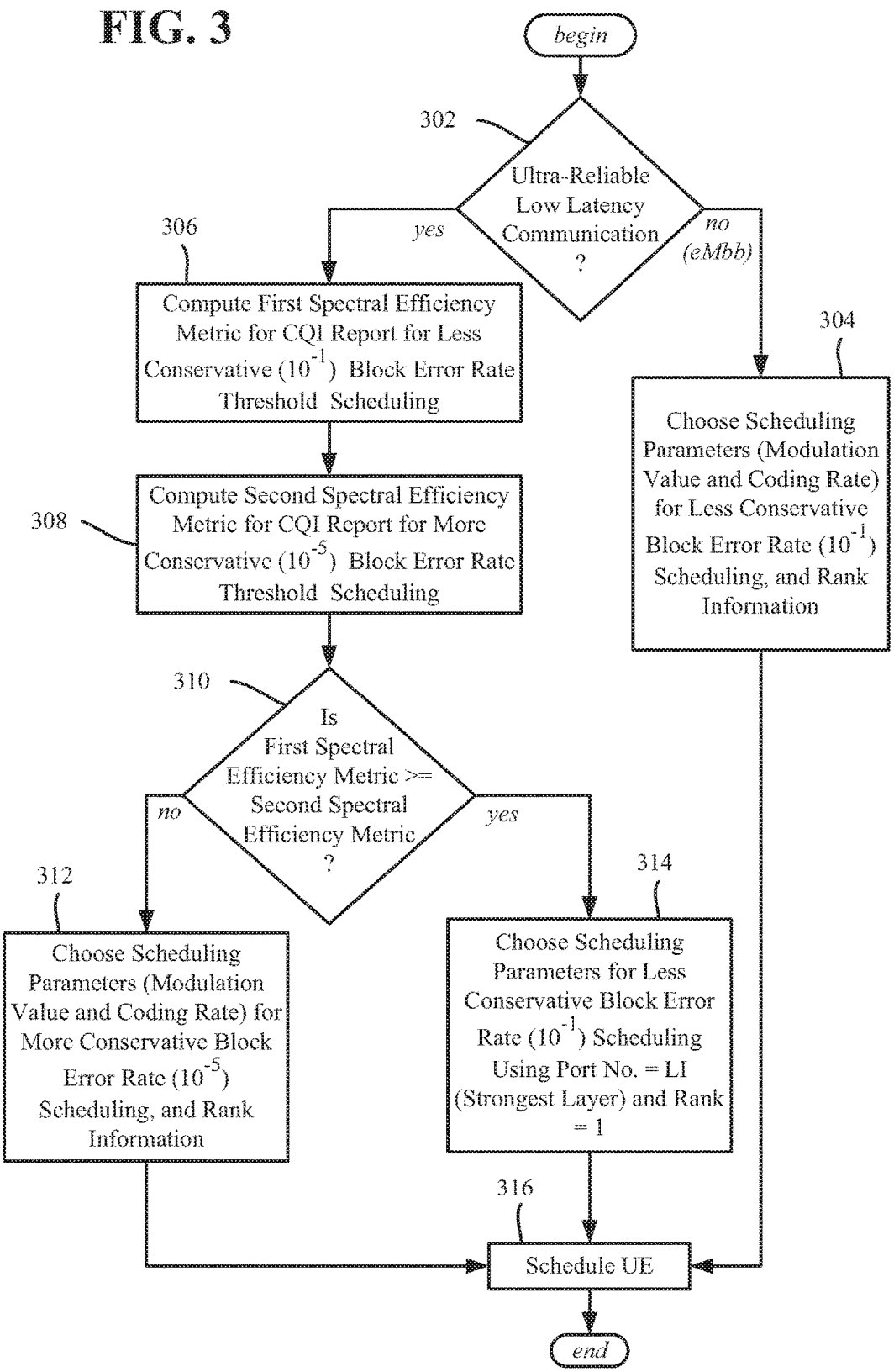
FIG. 3 is an example flow diagram of network node operations for scheduling a user equipment, in accordance with various aspects and implementations of the subject disclosure.

As represented in FIG. 3, once the reported information is known, for eMbb traffic, operations 302 and 304 use the scheduling parameters (modulation value and coding rate) for less conservative block error rate ($10^{-1}$) scheduling, and rank information to schedule the user equipment (operation 316).

Otherwise, operations 306 and 308 are performed, to determine the spectral efficiency metrics as described herein. Then, based on whether SE1≥SE2, the scheduling parameters are chosen as described above. If SE1<SE2 operation 312 chooses the scheduling parameters for the more conservative block error rate threshold; otherwise operation 314 chooses the scheduling parameters for the less conservative block error rate threshold. Note that with the less conservative block error rate threshold, the user equipment is scheduled to use the port that corresponds to the layer indicator, so that the strongest layer is used, likely resulting in a smaller block error rate. Operation 316 schedules the user equipment, e.g., using PDSCH.

Note that the operations in FIG. 3 generally refer to network device operations, because from the CSI report(s), the network device has the information needed to make the determination of the scheduling parameters. In an alternative implementation, at least some of the computations can be performed by the user equipment. For example, the user equipment can determine ad compare the spectral efficiencies, and thereby notify the network device of the result, e.g., recommend scheduling according to Case 1 or Case 2.

Turning to another aspect, multipoint communication, in which the user equipment 102(1) communicates with two (or more) network devices 404 and 405, allows for both less conservative scheduling parameters and more conservative scheduling parameters to be used with a repeated data communication, e.g., to make the communication more reliable. To this end, the network devices 404 and 405 communicate with one another, e.g., via the core network 408 or other suitable communications path.

Figure 4:
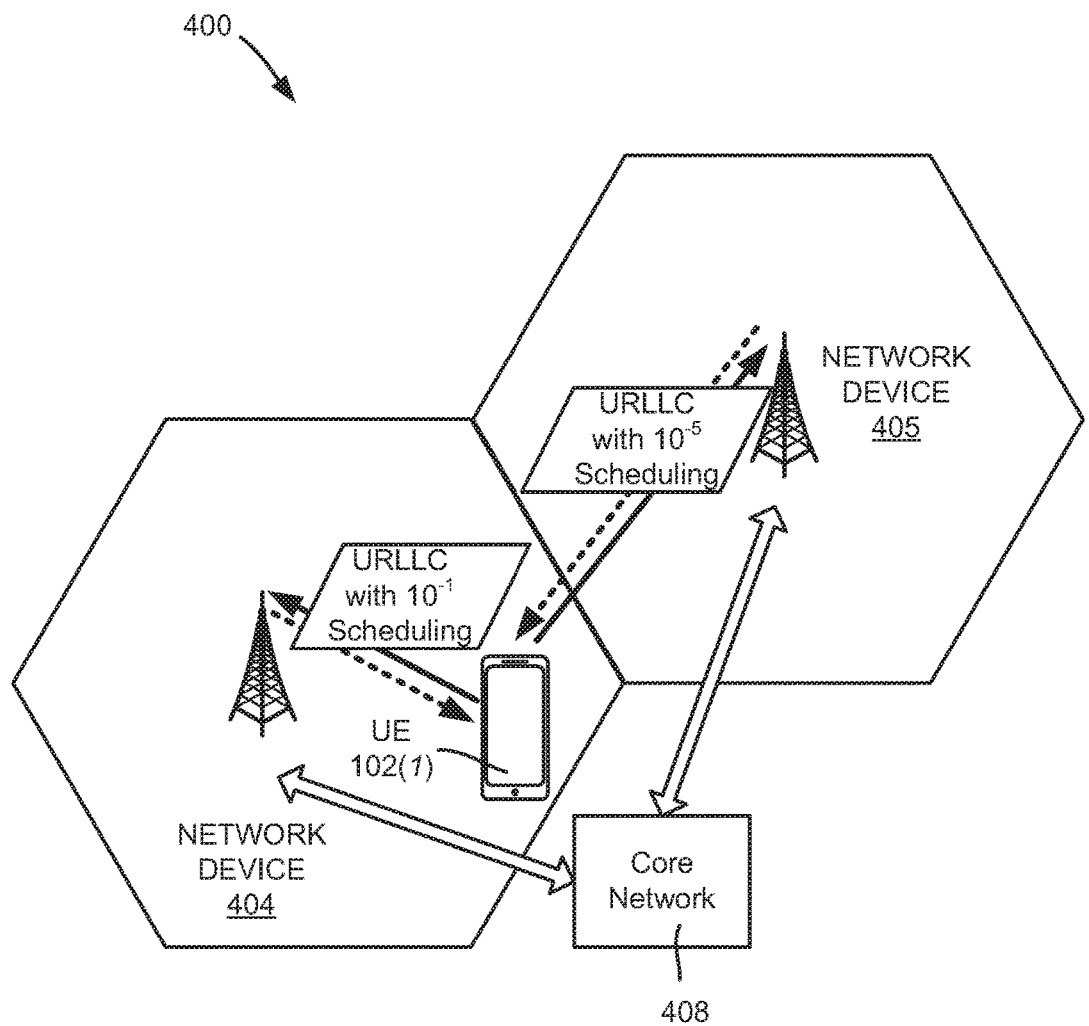
FIG. 4 illustrates an example wireless communication system in which network nodes use multipoint communication for ultra-reliable low latency communications, in accordance with various aspects and implementations of the subject disclosure.

In the example of FIG. 4, the network device 404 schedules the user equipment to use the less conservative scheduling parameters, and (via communication with the network device 405), has the network device 405 schedule the user equipment using the more conservative scheduling parameters. The data to be communicated is thus redundant, whereby the network device receives (if uplink) the data correctly, whether via the wireless communication with the user equipment or via a further communication from the network device 405. If downlink, the user equipment is intended to receive the communication from both sources; although errors are possible, the redundancy helps avoid retransmissions. Note that this allows fewer resources to be used by the network device 404, independent of any spectral efficiency computations and comparison.

Indeed, the use of resources can be negotiated, e.g., the network device 404 can use the more conservative scheduling parameters and have the network device 405 use the less conservative scheduling parameters. It also should be noted that because the network devices 404 and 405 communicate, each network device can independently schedule the user equipment, or one user device can schedule the user equipment for both communications.

Figure 5:
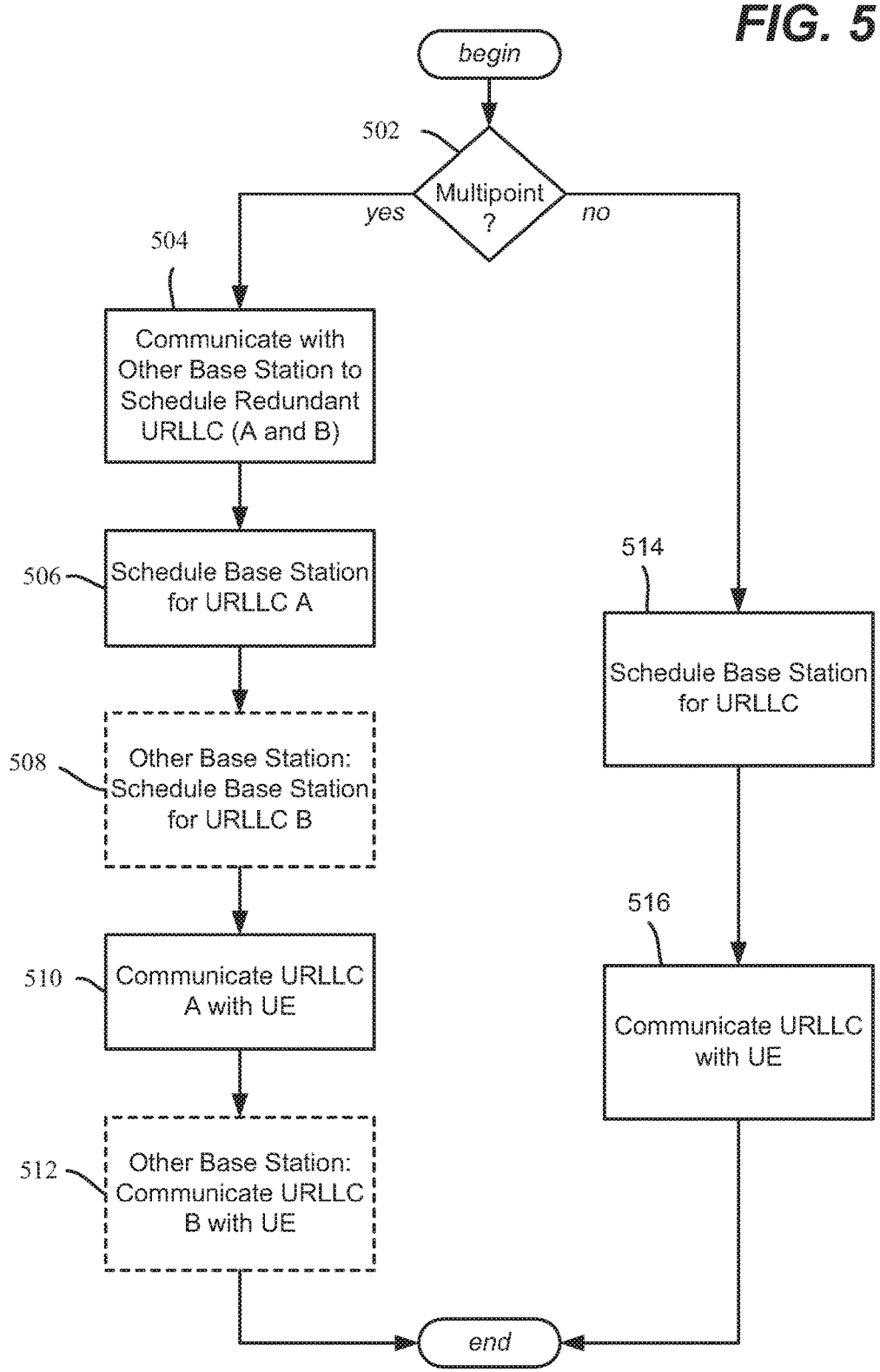
FIG. 5 illustrates an example flow diagram of scheduling a user equipment including when multipoint communication is available for ultra-reliable low latency communications, in accordance with various aspects and implementations of the subject disclosure

FIG. 5 represents example operations of the network device in a multipoint-capable environment. If multipoint, operation 502 branches to operation 504 where the redundant communication is negotiated between the two network devices. Operation 506 represents the base station scheduling one URLLC data traffic, URLLC A, while operation 506 (the dashed block) represents the other base station scheduling the other URLLC data traffic, URLLC B. Operations 510 and 512 represent these communications, as scheduled.

Figure 6:
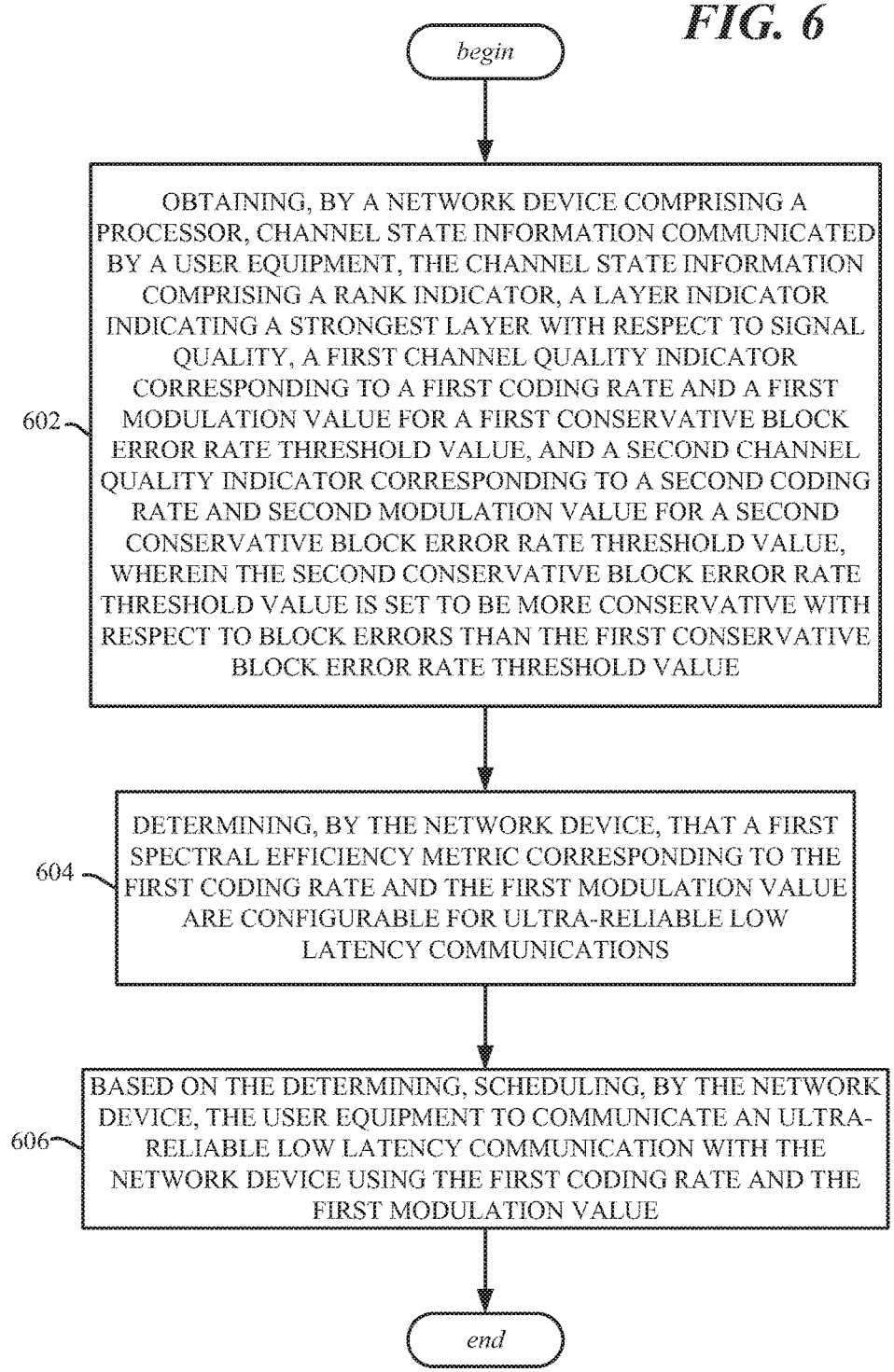
FIG. 6 illustrates a flow diagram of example network device operations, in accordance with various aspects and implementations of the subject disclosure.

If not multipoint, or multipoint is not currently available, operation 502 branches to operation 514 where the base station (the only one scheduling the user equipment) can perform the scheduling as described above, e.g., with reference to FIG. 3. Operations 516 represents the data communication, as scheduled FIG. 6 summarizes various example operations of a network device, including operation 602 which represents obtaining, by a network device comprising a processor, channel state information communicated by a user equipment, the channel state information comprising a rank indicator, a layer indicator indicating a strongest layer with respect to signal quality, a first channel quality indicator corresponding to a first coding rate and a first modulation value for a first conservative block error rate threshold value, and a second channel quality indicator corresponding to a second coding rate and second modulation value for a second conservative block error rate threshold value, wherein the second conservative block error rate threshold value is set to be more conservative with respect to block errors than the first conservative block error rate threshold value. Operation 604 represents determining, by the network device, that a first spectral efficiency metric corresponding to the first coding rate and the first modulation value are configurable for ultra-reliable low latency communications. Operation 606 represents, based on the determining, scheduling, by the network device, the user equipment to communicate an ultra-reliable low latency communication with the network device using the first coding rate and the first modulation value.

Scheduling the user equipment to communicate the ultra-reliable low latency communication with the network device can comprise scheduling the user equipment to use the strongest layer.

Scheduling the user equipment to communicate the ultra-reliable low latency communication with the network device can comprise transmitting to the user equipment transmission rank data, modulation and coding scheme data, and a demodulation reference signal port indication corresponding to the layer indicator.

Aspects can comprise computing a first spectral efficiency metric based on the first coding rate and the first modulation value, computing a second spectral efficiency metric based on the second coding rate, second modulation value and the rank information. Determining that the first spectral efficiency metric corresponding to the first coding rate and the first modulation value are configurable for ultra-reliable low latency communications can comprise determining that the second spectral efficiency metric is less than the first spectral efficiency metric.

Determining that the first spectral efficiency metric corresponding to the first coding rate and the first modulation value are configurable for ultra-reliable low latency communications can comprise determining that the rank indicator is at least two.

The network device can be a first network device; aspects can comprise scheduling, by a second network device in cooperation with the first network device, the user equipment to communicate the ultra-reliable low latency communication with the network device using the second coding rate and the second modulation value.

The network device can be a first network device; aspects can comprise scheduling, by a second network device in cooperation with the first network device, the user equipment to communicate the ultra-reliable low latency communication with the network device using a third coding rate and a third modulation value corresponding to a third conservative block error rate threshold value, wherein the third conservative block error rate threshold value is set to be more conservative with respect to block errors than the second conservative block error rate threshold value.

Aspects can comprise scheduling, by the network device, the user equipment to communicate an enhanced mobile broadband communication with the network device, comprising transmitting to the user equipment transmission rank data, and modulation and coding scheme data.

Figure 7:
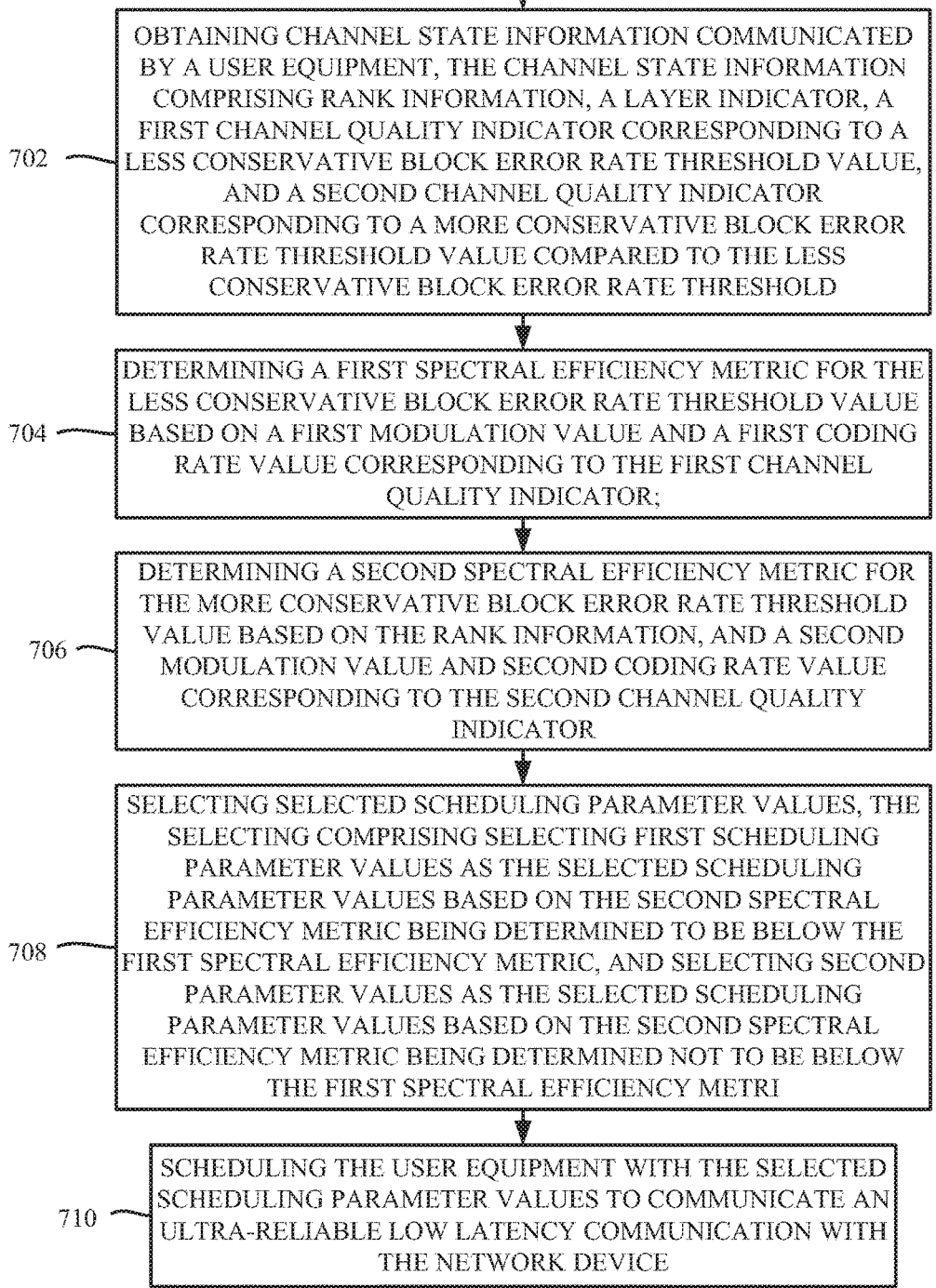
FIG. 7 illustrates a flow diagram of example operations of a network device, in accordance with various aspects and implementations of the subject disclosure.

One or more aspects, generally represented in FIG. 7, represent example operations comprising obtaining (operation 702), by a network device comprising a processor, channel state information communicated by a user equipment, the channel state information comprising rank information, a layer indicator, a first channel quality indicator corresponding to a less conservative block error rate threshold value, and a second channel quality indicator corresponding to a more conservative block error rate threshold value compared to the less conservative block error rate threshold. Operation 704 represents determining a first spectral efficiency metric for the less conservative block error rate threshold value based on a first modulation value and a first coding rate value corresponding to the first channel quality indicator. Operation 706 represents determining a second spectral efficiency metric for the more conservative block error rate threshold value based on the rank information, and a second modulation value and second coding rate value corresponding to the second channel quality indicator; Operation 708 represents selecting selected scheduling parameter values, the selecting comprising selecting first scheduling parameter values as the selected scheduling parameter values based on the second spectral efficiency metric being determined to be below the first spectral efficiency metric, and selecting second parameter values as the selected scheduling parameter values based on the second spectral efficiency metric being determined not to be below the first spectral efficiency metric; Operation 710 represents scheduling the user equipment with the selected scheduling parameter values to communicate an ultra-reliable low latency communication with the network device.

The layer indicator can indicate a strongest layer with respect to signal quality, wherein the second spectral efficiency metric is less than the first spectral efficiency metric, and wherein the first scheduling parameter values schedule the user equipment to use the strongest layer. The second spectral efficiency metric can be below the first spectral efficiency metric, and the first scheduling parameter values can comprise user equipment transmission rank data, modulation and coding scheme data, and a demodulation reference signal port indication corresponding to the layer indicator.

The network device can be a first network device, selecting the selected scheduling parameter values can comprise selecting the first scheduling parameter values as the selected scheduling parameter values; aspects can comprise communicating with a second network device to communicate the ultra-reliable low latency communication with the user equipment using the second parameter values.

The network device can be a first network device, selecting the selected scheduling parameter values can comprise selecting the first scheduling parameter values as the selected scheduling parameter values; aspects can comprise communicating with a second network device to communicate the ultra-reliable low latency communication with the user equipment using other scheduling parameter values corresponding to a more conservative block error rate threshold value.

Aspects can comprise, scheduling the user equipment to communicate an enhanced mobile broadband communication with the network device, the scheduling comprising transmitting to the user equipment transmission rank data, and modulation and coding scheme data.

Figure 8:
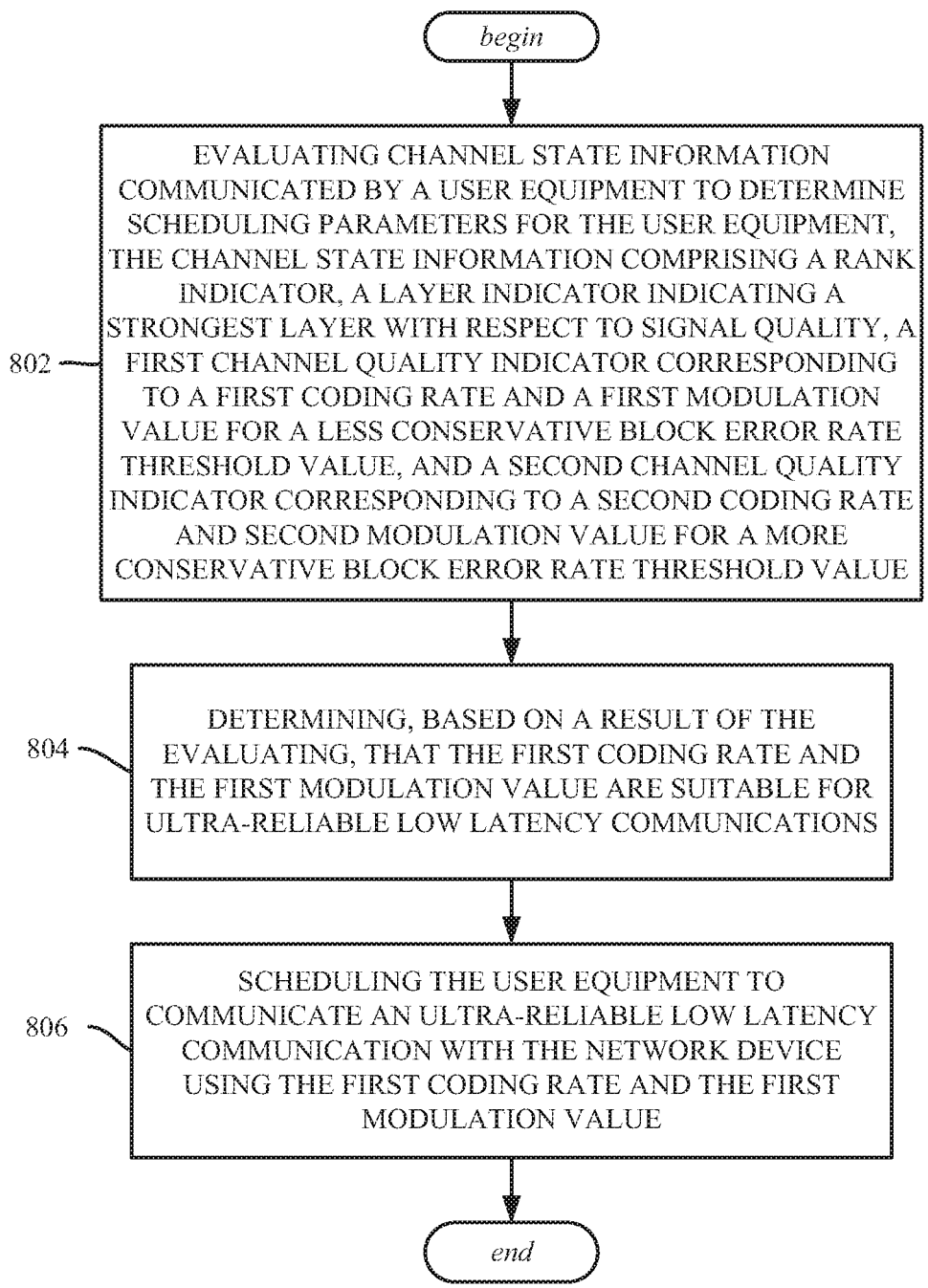
FIG. 8 illustrates a flow diagram of example aspects of operations, e.g., of a network device, in accordance with various aspects and implementations of the subject disclosure.

FIG. 8 represents example operations, e.g., of a machine-readable storage medium, comprising executable instructions that, when executed by a processor of a network device, facilitate performance of the operations. Operation 802 represents evaluating channel state information communicated by a user equipment to determine scheduling parameters for the user equipment, the channel state information comprising a rank indicator, a layer indicator indicating a strongest layer with respect to signal quality, a first channel quality indicator corresponding to a first coding rate and a first modulation value for a less conservative block error rate threshold value, and a second channel quality indicator corresponding to a second coding rate and second modulation value for a more conservative block error rate threshold value. Operation 804 represents determining, based on a result of the evaluating, that the first coding rate and the first modulation value are suitable for ultra-reliable low latency communications. Operation 806 represents scheduling the user equipment to communicate an ultra-reliable low latency communication with the network device using the first coding rate and the first modulation value.

Scheduling the user equipment to communicate the ultra-reliable low latency communication with the network device can comprise scheduling the user equipment to use the strongest layer. Scheduling the user equipment to communicate the ultra-reliable low latency communication with the network device can comprise transmitting to the user equipment transmission rank data, modulation and coding scheme data, and a demodulation reference signal port indication corresponding to the layer indicator.

Evaluating can comprise determining a first spectral efficiency metric based on the first coding rate and the first modulation value, and determining a second spectral efficiency metric based on the second coding rate, second modulation value and the rank information, and determining that the first coding rate and the first modulation value are suitable for ultra-reliable low latency communications can comprise determining that the second spectral efficiency metric is less than the first spectral efficiency metric.

Determining that the first coding rate and the first modulation value are suitable for ultra-reliable low latency communications can comprise determining that the rank indicator is at least two. Further aspects can comprise scheduling the user equipment to communicate an enhanced mobile broadband communication with the network device, comprising transmitting to the user equipment transmission rank data, and modulation and coding scheme data corresponding to the first coding rate and the first modulation value.

Figure 9:
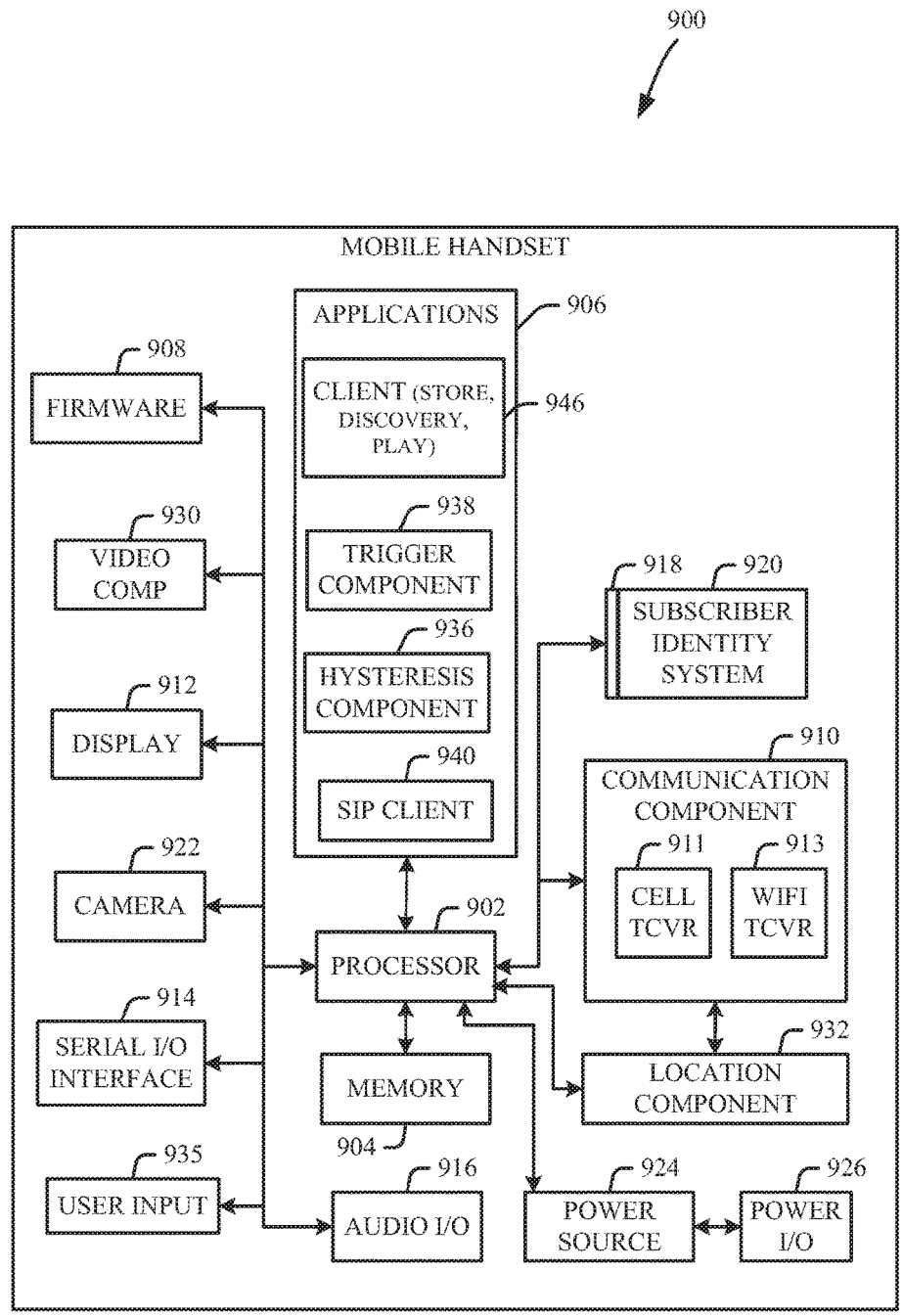
FIG. 9 illustrates an example block diagram of an example mobile handset operable to engage in a system architecture that facilitates wireless communications according to one or more embodiments described herein.

As can be seen, there is provided improved reliability for data channels, thereby reducing the power for data communications. There are reduced resources for data channels, as the number of re-transmissions is less. The user experience is improved as the reliability of data transmission is improved, and the latency is reduced Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 994) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
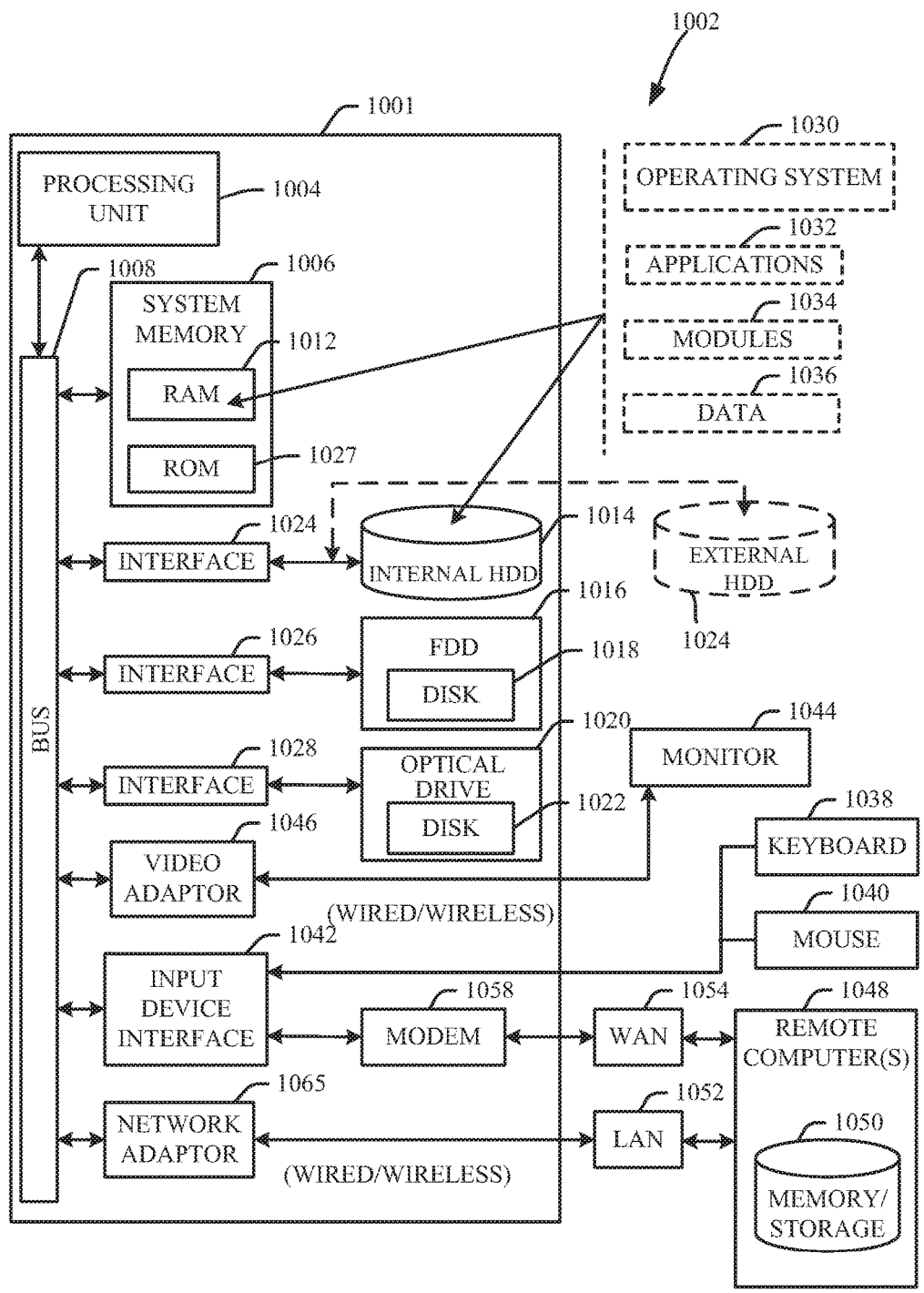
FIG. 10 illustrates an example block diagram of an example computer operable to engage in a system architecture that facilitates wireless communications according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 10 is but one example of a computing device.

In order to provide a context for the various aspects of the disclosed subject matter, FIG. 10 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of the hardware of system 1020, includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PC-MCIA), Firewire (IEEE 1394), and Small Computer Systems Interface (SCSI).

System memory 1016 can include volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, a mobile device and/or portable device can include a user interface embodied in a touch sensitive display panel allowing a user to interact with computer 1012. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 and a move use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising,
    obtaining, by a network device comprising a processor, channel state information communicated by a user equipment, the channel state information comprising a rank indicator, a layer indicator indicating a strongest layer with respect to signal quality, a first channel quality indicator corresponding to a first coding rate and a first modulation value for a first conservative block error rate threshold value, and a second channel quality indicator corresponding to a second coding rate and second modulation value for a second conservative block error rate threshold value, wherein the second conservative block error rate threshold value is set to be more conservative with respect to block errors than the first conservative block error rate threshold value;
    determining, by the network device, that a first spectral efficiency metric corresponding to the first coding rate and the first modulation value are configurable for ultra-reliable low latency communications, and
    based on the determining, scheduling, by the network device, the user equipment to communicate an ultra-reliable low latency communication with the network device using the first coding rate and the first modulation, wherein the scheduling the user equipment to communicate the ultra-reliable low latency communication with the network device further comprises scheduling the user equipment to use the strongest layer value.

2. The method of claim 1, wherein the scheduling the user equipment to communicate the ultra-reliable low latency communication with the network device comprises transmitting to the user equipment transmission rank data, modulation and coding scheme data, and a demodulation reference signal port indication corresponding to the layer indicator.

3. The method of claim 1, further comprising, computing a first spectral efficiency metric based on the first coding rate and the first modulation value, computing a second spectral efficiency metric based on the second coding rate, second modulation value and the rank information, and wherein the determining that the first spectral efficiency metric corresponding to the first coding rate and the first modulation value are configurable for ultra-reliable low latency communications comprises determining that the second spectral efficiency metric is less than the first spectral efficiency metric.

4. The method of claim 1, wherein the determining that the first spectral efficiency metric corresponding to the first coding rate and the first modulation value are configurable for ultra-reliable low latency communications comprises determining that the rank indicator is at least two.

5. The method of claim 1, wherein the network device is a first network device, and further comprising, scheduling, by a second network device in cooperation with the first network device, the user equipment to communicate the ultra-reliable low latency communication with the network device using the second coding rate and the second modulation value.

6. The method of claim 1, wherein the network device is a first network device, and further comprising, scheduling, by a second network device in cooperation with the first network device, the user equipment to communicate the ultra-reliable low latency communication with the network device using a third coding rate and a third modulation value corresponding to a third conservative block error rate threshold value, wherein the third conservative block error rate threshold value is set to be more conservative with respect to block errors than the second conservative block error rate threshold value.

7. The method of claim 1, further comprising, scheduling, by the network device, the user equipment to communicate an enhanced mobile broadband communication with the network device, comprising transmitting to the user equipment transmission rank data, and modulation and coding scheme data.

8. A machine-readable storage medium, comprising executable instructions that, when executed by a processor of a network device, facilitate performance of operations, the operations comprising:
    evaluating channel state information communicated by a user equipment to determine scheduling parameters for the user equipment, the channel state information comprising a rank indicator, a layer indicator indicating a strongest layer with respect to signal quality, a first channel quality indicator corresponding to a first coding rate and a first modulation value for a less conservative block error rate threshold value, and a second channel quality indicator corresponding to a second coding rate and second modulation value for a more conservative block error rate threshold value;
    determining, based on a result of the evaluating, that the first coding rate and the first modulation value are suitable for ultra-reliable low latency communications, and scheduling the user equipment to communicate an ultra-reliable low latency communication with the network device using the first coding rate and the first modulation, wherein the scheduling the user equipment to communicate the ultra-reliable low latency communication with the network device further comprises scheduling the user equipment to use the strongest layer value.

9. The machine-readable storage medium of claim 8, wherein the scheduling the user equipment to communicate the ultra-reliable low latency communication with the network device comprises transmitting to the user equipment transmission rank data, modulation and coding scheme data, and a demodulation reference signal port indication corresponding to the layer indicator.

10. The machine-readable storage medium of claim 8, wherein the evaluating comprises determining a first spectral efficiency metric based on the first coding rate and the first modulation value, and determining a second spectral efficiency metric based on the second coding rate, second modulation value and the rank information, and wherein the determining that the first coding rate and the first modulation value are suitable for ultra-reliable low latency communications comprises determining that the second spectral efficiency metric is less than the first spectral efficiency metric.

11. The machine-readable storage medium of claim 8, wherein the determining that the first coding rate and the first modulation value are suitable for ultra-reliable low latency communications further comprises determining that the rank indicator is at least two.

12. The machine-readable storage medium of claim 8, wherein the operations further comprise, scheduling the user equipment to communicate an enhanced mobile broadband communication with the network device, comprising transmitting to the user equipment transmission rank data, and modulation and coding scheme data corresponding to the first coding rate and the first modulation value.

* * * * *